July 29, 1969　　　O. LUTZ　　　3,458,020
HYDRAULIC FRICTION CLUTCH

Filed Dec. 26, 1967　　　2 Sheets-Sheet 1

Inventor:
OTTO LUTZ

BY: Craig & Antonelli
ATTORNEYS

_ _ _

3,458,020
HYDRAULIC FRICTION CLUTCH
Otto Lutz, Bienroder Weg 52, Braunschweig-
Kralenriede, Germany
Filed Dec. 26, 1967, Ser. No. 693,621
Claims priority, application Germany, Dec. 24, 1966,
L 55,362
Int. Cl. F16d 31/00, 11/00, 25/00
U.S. Cl. 192—58                                   12 Claims

ABSTRACT OF THE DISCLOSURE

A hydraulic friction clutch in which at least two clutch disks, one connected with a shaft and the other with a rotating housing, are mounted in fixed spaced relationship within the housing whereby the amount of liquid depending on the torque to be transferred is circulated between the clutch surfaces of the disks by a pumping system supplying the liquid near the inner periphery of the clutch disks; the rotating housing is provided at the outer periphery with an annulus receiving substantially the entire amount of the liquid under the action of centrifugal forces while a pipe disposed within the housing withdraws fluid from the annulus and discharges the same near the inner periphery of the clutch disks; the flow through the pipe is controlled by a valve which in turn is controlled, for example, depending on the pressure, temperature, speed, etc.

_ _ _

This invention relates to a hydraulic friction clutch having its clutch surfaces mounted in invariably spaced relationship, between which an amount of the clutch liquid depending on the torque to be transmitted is kept in circulation by a pumping system which feeds the liquid at the inner periphery of said clutch surfaces, the support members of the clutch surface being firmly secured, on the one hand, with a shaft and, on the other hand, with a rotating housing.

In a known liquid friction clutch of this type the clutch members are mounted within a stationary housing in which the flowing clutch liquid is ejected through openings provided at the periphery of the rotating clutch housing. The liquid is then again delivered from the stationary clutch housing between the clutch surfaces by means of a conventional pump. In addition, openings are provided in the clutch housing for a quick release of the liquid present between the clutch members. This known clutch has the disadvantage that it is bulky and that furthermore the secondary drive can only be effected through a shaft connected with the rotating housing, and finally that a separate pump has to be provided for the circulation of the liquid (German patent specification No. 857,720).

Other hydraulic friction clutches are known which operate on different wetting surfaces. With these clutches a liquid ring develops, the inner surface of which is adjusted to the desired respective radius by discharge or supply of liquid. This adjustment is effected in that a portion of the volume of liquid is received in a separate liquid chamber and is then transferred from said liquid chamber, according to the torque to be transmitted, into the clutch chamber proper through a mechanical displacement system. In this instance, however, the transfer of the oil into the clutch chamber and the discharge from said clutch chamber requires an intricate linkage mechanism for said displacement system. Moreover, also these clutches have a considerable structural volume required by the receiving spaces and the necessary displacement system; finally, substantial adjusting powers are to be applied which very often are not available particularly with clutches which, for example, are to be controlled in response to temperature (German patent specification No. 629,716).

It is an object of the present invention to provide a hydraulic clutch which is simple in construction and in which the torque to be transmitted can be controlled with a minimum of adjusting powers.

According to the invention this problem is solved in that the clutch housing is closed all around, that an annulus is provided in the housing chamber on the outer periphery thereof, which annulus receives, under the action of the centrifugal force, the total amount of liquid in the form of a liquid ring which does not come in contact with the clutch surfaces belonging to the other clutch member, that at least one pipe is mounted in the housing chamber, which pipe terminates with an opening extending in a direction opposite to the direction of rotation of the housing in the outer annulus of the housing chamber whilst the other end of said pipe terminates at the inner periphery of the clutch surfaces, and that a valve is provided which can be operated from the outside and which controls the liquid flow through said pipe.

The invention is illustrated in the drawings and will be apparent from the following descritpion.

Figure 1:
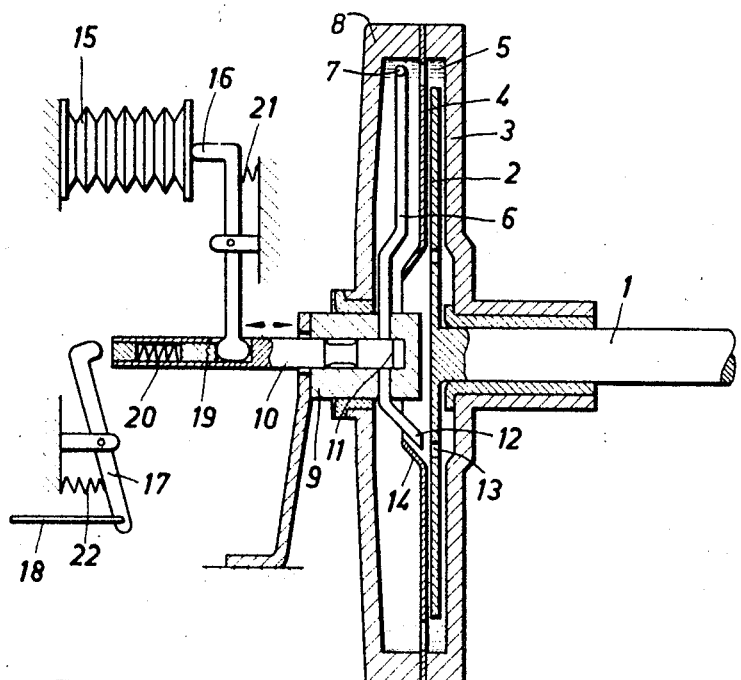
FIG. 1 is an axial longitudinal sectional view of a clutch showing one embodiment according to the invention.

In the embodiment shown in FIG. 1 the driving shaft 1 carries the driving disc 2 mounted with a small space between the inner wall of the housing 3 of the driven clutch member and the disc 4 firmly secured to the housing of said driven clutch member. While engaged the viscous liquid has to fill the spaces between the disc 2 and the adjacent surfaces of the wall of the housing 3 and the disc 4.

Figure 2:
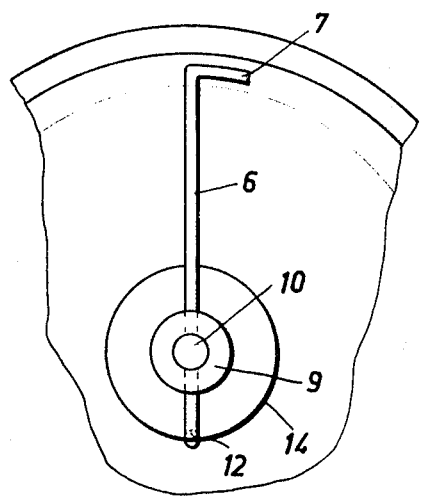
FIG. 2 is a partly-broken-away view in a section perpendicular to the axis of the coupling.

An outer annulus 5 is provided to receive said viscous liquid, said annulus being dimensioned large enough so as to allow the total amount of liquid to be taken in without the driving disc 2 being wetted by the viscous liquid. On the opposite side of the disc 4 developed as a partition wall there is provided a further space wherein a pipe 6 is mounted, the latter not taking part in the rotation. Said pipe 6 is provided with a bend 7 at its end positioned in said annulus 5, said bend 7 extending in a direction opposite to the direction of rotation of the clutch (FIG. 2). The pipe 6 is supported by a stationary stub axle 9 on which the housing 3, 8 is rotatably mounted. Said stub axle 9 has a bore wherein a control piston 10 having a control edge 11 is axially slidably mounted. Said control edge 11 serves to control the cross-section of the connecting bore of said pipe 6. By axial displacement of the control edge 11 the cross-section of said connecting bore may be more or less closed.

The transfer of the liquid supplied by said pipe at the rear end of the control edge 11 (downstream according to the drawing) is effected through a pipe 12 which reintroduces the liquid drawn off from said annulus 5 and controlled by said control edge 11 into the spaces on both sides of the driving disc 2. The central portion of the disc 4 is of conical shape, and the pipe 12 transfers the liquid behind the edge 14 of the cone. Bores 13 are provided in order that both sides of the driving disc 2 are wetted by the liquid. Also the disc 4 has transverse bores within the region of the annulus 5 to ensure equalization of liquid in said annulus.

In the inoperative position the liquid collects in the lower part of the housing 3, 8, the driving disc 2 being partly wetted so that on starting a torque will be transmitted at any time which is sufficient enough as to accelerate the housing 3, 8, which when using the clutch as a fan clutch may carry blades (not shown) so that a liquid ring develops from which the pipe 6 may draw liquid.

While the flow of liquid through the pipe 6 is blocked by the control piston 10 a torque will be transmitted which is just sufficient to develop said liquid ring.

In case of using the coupling for a fan the control piston 10 may be controlled, as shown in FIG. 1, by means of bellows 15 responsive to the temperature of the cooling water, said bellows—in the embodiment according to FIG. 1—being connected with the control piston through a two-armed lever 16 so that with a rising temperature of the cooling water the free cross-sectional area for the liquid flow through the pipe 6 will be increased.

In case of motor vehicles the air stream is in general sufficient for the cooling when driving at higher speed.

Therefore, in the clutch according to the invention additional means may be provided to disconnect the fan when driving at higher speed. For this purpose there is provided, as is shown in FIG. 1, a two-armed lever 17 operable by means of a draw member 18 such as a cable and normally out of engagement with the control piston 10. By pulling said member 18 the control piston 10 may be moved to the right, thus blocking the flow of liquid through the pipe 6. In order to avoid a loading of bellows 15 by actuation of the lever 17 the arm of the lever 16 which is in engagement with said control piston 10 bears against a piston 19 slidably mounted in the central piston 10, said piston 19 being under the action of a pressure spring 20. Levers 16 and 17 are each acted upon by pressure springs 21 and 22.

The draw member 18 may be actuated either by hand, for instance, by a knob provided on the instrument panel. On the other hand, said draw member 18 may also be connected with the armature of an electromagnet which in turn may be operated by hand or may be operated automatically as a function of the speed of the vehicle.

Finally, it would be possible to construct the outer end of the control piston 10 as a magnet armature, providing the magnet coil immediately coaxially with respect to the control piston.

Figure 3:
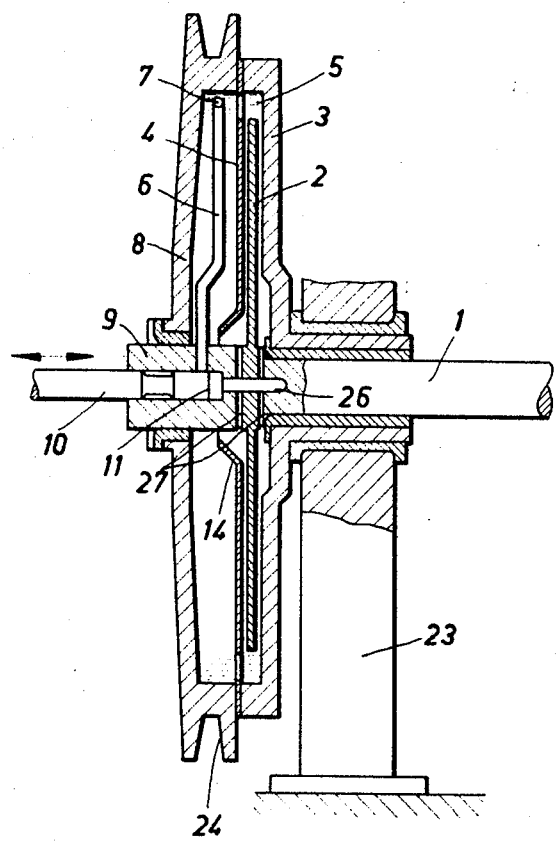
FIG. 3 is an axial longitudinal sectional view of a clutch showing another embodiment according to the invention.

In a modified embodiment shown in FIG. 3 the same parts are indicated by the same reference numerals as shown in FIG. 1. Departing from the embodiment according to FIG. 1 the clutch of the modified embodiment is carried by a support 23 in which the clutch housing 3, 8 is rotatably mounted. Furthermore, in this embodiment the stub axle 9 constituting the valve housing for the control piston 10 and the pipe 6 are firmly secured to the shaft 1. Furthermore, the outer housing is provided with means by which said outer housing can be driven; for example, as shown in the drawing (FIG. 3), said means being a groove 24 for a V-belt.

In the embodiment as shown in FIG. 3 the outer housing is always the driving part of the clutch while the shaft 1 with the clutch disc 2 is the driven part. With this embodiment, the liquid flow through the pipe 6 depends on the differential speed or slip between the driving and driven parts of the coupling. The transmission of a torque to the driven shaft 1 in this embodiment requires in any case a slip between said shaft 1 and the outer clutch housing. Thus, the pressure head in front of the inlet of the pipe and consequently the flow of liquid through the pipe is increased the higher the differential speed or slip speed is.

Also in this case the control piston 10 is axially slidable and can be non-rotatably mounted so that said piston rotates in the stub axle 9. The axial displacement of the control piston may be effected in a manner as described above with reference to FIG. 1.

Departing from the embodiment according to FIG. 1 the transfer of the clutch liquid from the valve housing is effected through an axial bore 26 which communicates with radial bores 27 opening at both sides of the clutch disc 2. This treatment of the liquid through such bores will also be possible in an embodiment as shown in FIG. 1, wherein the liquid can be transferred through a rotatable connection into an extension of the axial bore in the shaft.

As will readily be seen in both embodiments two or more clutch discs may as well be provided on the shaft, said clutch discs being interengaged by clutch discs attached to the housing.

In an embodiment of the type comprising a plurality of clutch discs the transfer of the oil delivered from the pipe 6 through bores corresponding to the bores 26 and 27 is particularly advantageous.

It will be obvious that instead of one pipe as shown in the drawings a plurality of pipes may be provided as well.

What I claim is:

1. A hydraulic friction clutch with two clutch members, comprising clutch surface means belonging, respectively, to one and the other clutch member and mounted in invariably spaced relationship, an amount of clutch liquid depending on the torque to be transferred being kept in circulation between said clutch surface means by a pumping system which supplies the liquid near the inner periphery of said clutch surface means, said clutch surface means being firmly secured, on the one hand, with a shaft and, on the other hand with a rotating housing forming a housing chamber, an annulus being provided in the housing chamber on the outer periphery thereof, said annulus receiving, under the action of the centrifugal force, substantially the total amount of liquid in the form of a liquid ring which does not come in contact with the clutch surface means belonging to the other clutch member, at least one pipe mounted in the housing chamber, one end of said pipe being provided with an opening extending in a direction opposite to the direction of rotation of the housing within the outer annulus of the housing chamber while the other end of said pipe terminates near the inner periphery of the clutch surface means and valve means for controlling the liquid flow through said pipe.

2. A hydraulic clutch as claimed in claim 1, wherein the pipe is provided with a bend at its end positioned in said annulus, said bend extending in a direction opposite to the direction of rotation.

3. A hydraulic clutch as claimed in claim 1, wherein said pipe is mounted substantially radially in the housing chamber.

4. A hydraulic clutch as claimed in claim 1, wherein said pipe is supported by a stationary journal with the valve means mounted therein.

5. A hydraulic clutch as claimed in claim 4, wherein said valve means includes a piston valve, said piston valve being guided in an axial bore of said journal.

6. A hydraulic clutch as claimed in claim 1, wherein one of said clutch surface means forms a clutch disk of the housing, said clutch disk being disposed adjacent the pipe and being provided at its inner periphery with an open cone, and a further pipe communicating with the valve space and terminating within said cone in front of another clutch disk rotatable relative to the clutch disk provided with said cone.

7. A hydraulic clutch as claimed in claim 6, wherein the clutch disk rotatable relative to the clutch disk provided with the cone is provided with bores, said further pipe terminating within the area of said bores.

8. A hydraulic clutch as claimed in claim 1, wherein the outer clutch housing is rotatably mounted in a fixed bearing and is provided with means for receiving the drive and wherein the pipe is firmly secured to the driven clutch member.

9. A hydraulic clutch as claimed in claim 8, wherein the valve means includes a piston valve which is guided in an axial bore of the driven clutch member.

10. A hydraulic clutch as claimed in claim 1, wherein the valve means includes a piston valve mounted coaxially with respect to the axis of rotation, said piston valve being guided in a valve chamber having in its peripheral area a bore with which the pipe is in communication, said valve chamber being further provided with an axial bore communicating with radial bores opening into the spaces between the clutch surface means.

11. A hydraulic clutch according to claim 1, wherein said valve means is operable from the outside.

12. A hydraulic clutch according to claim 11, wherein said housing is closed all around.

References Cited

UNITED STATES PATENTS

| | | |
|---|---|---|
| 1,616,252 | 2/1927 | Bratvold. |
| 2,210,416 | 8/1940 | Kiep et al. |
| 2,788,877 | 4/1957 | Richardson _____ 192—113.2 |
| 3,366,211 | 1/1968 | May _____ 192—113.2 |

CARLTON R. CROYLE, Primary Examiner

ALLAN D. HERRMANN, Assistant Examiner

U.S. Cl. X.R.

192—82, 85